Patented Nov. 25, 1924.

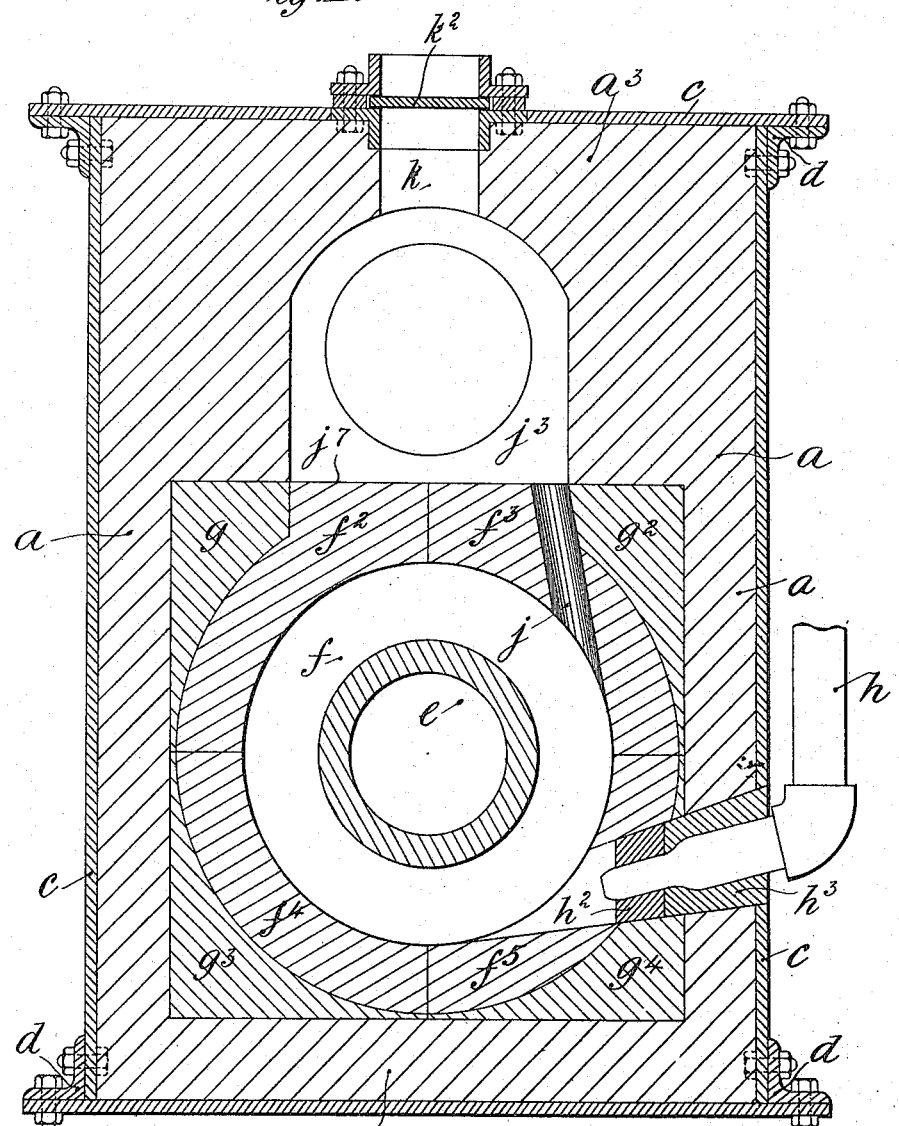

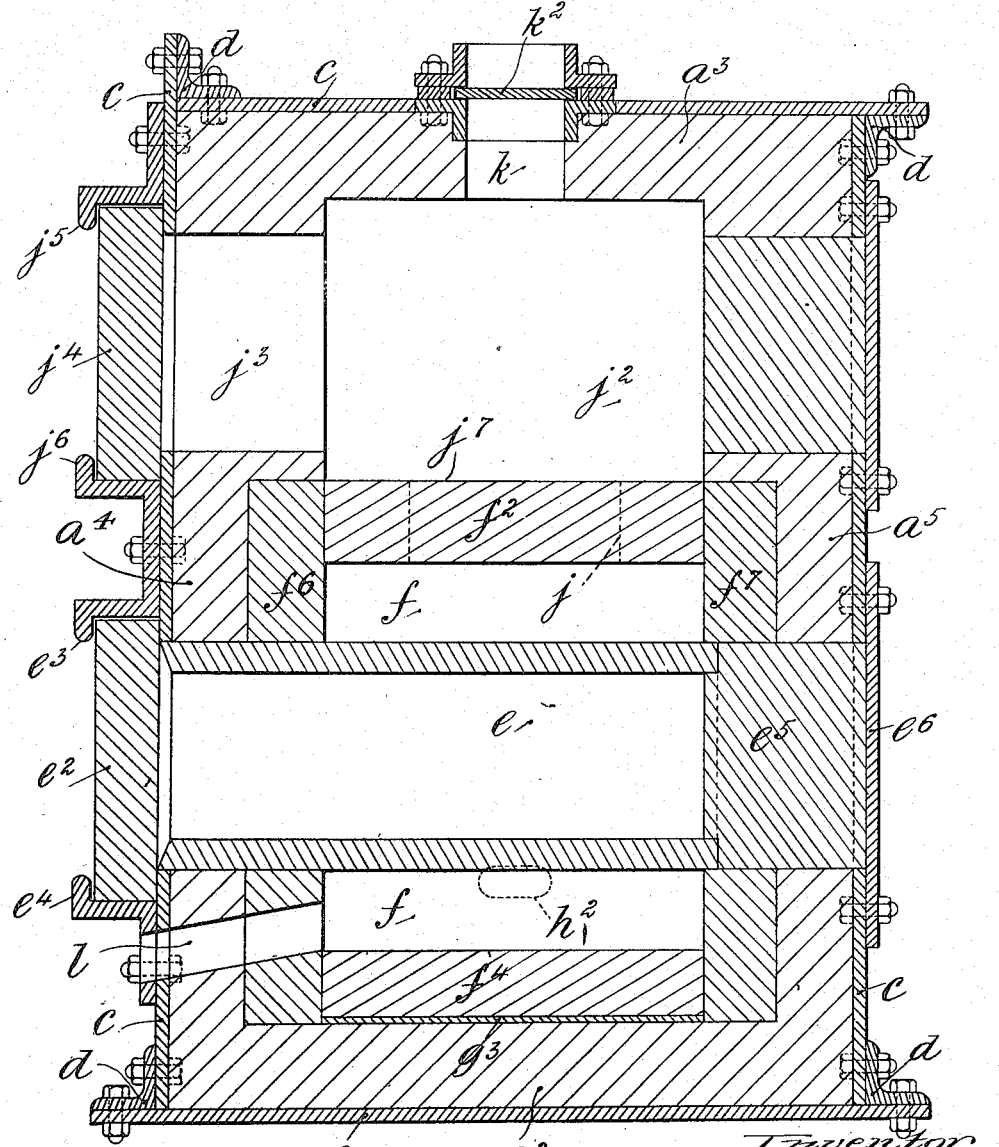

1,517,172

UNITED STATES PATENT OFFICE.

ALBERT EDWARD RUDD, OF WOLVERHAMPTON, ENGLAND.

MUFFLE FURNACE FOR HEAT TREATMENT OF STEEL.

Application filed March 21, 1923. Serial No. 626,585.

*To all whom it may concern:*

Be it known that I, ALBERT EDWARD RUDD, subject of the King of Great Britain, residing at 20 Manlove Street, Wolverhampton, England, have invented certain new and useful Improvements in Muffle Furnaces for Heat Treatment of Steel, of which the following is a specification.

The invention relates to a furnace having an enclosed main heating chamber suitable for heating high speed steel and provides the hereinafter described and claimed improvements therein.

According to the invention a distinctive construction of furnace of the above type is provided comprising a cylindrical main heating chamber adapted to be closed at both ends by doors or closing blocks and surrounded for the greater part of its length by a cylindrical flue the interior walls of which are parallel and into which the heating products enter tangentially at a position low down beneath the exterior walls of the chamber in such a manner that said products have a whirling action imparted to them without any substantial longitudinal traverse of same taking place. Said products approximately describe a path underneath the chamber aforesaid to and over the top proceeding downwardly for a distance and then pass upwardly through a tangentially disposed exit flue arranged in the top wall of the cylindrical flue where they enter a space constituting an upper heating chamber and are finally led away by a chimney for further utilization or dispersion.

By the above described whirling action of the heating products there is a tendency to maintain same for a longer period of time in close circulation with the outer walls of the main heating chamber, said products circulating at least once completely around the flue enclosing the cylindrical tubular structure aforesaid. The gases or heating products do not enter the interior of the cylindrical chamber, but by the circulating motion around same produce therein a uniform heat.

Said doors or closing blocks are removable for repairs and the like and also for permitting a rod or bar to be passed right through the interior of the main heating chamber should it be desirable to heat a portion intermediate of its ends although occasion rarely occurs. The cylindrical tubular structure may conveniently be formed of carborundum, as also may be the doors or closing blocks and the main cylindrical flue, the chief elements being enclosed and built up in suitable brick-work and encased externally and held rigidly by metal plates.

A furnace according to the invention may or may not include a pre-heating chamber, but in either case a main top exit flue is provided, and if a pre-heating chamber is used a side door to open or close same is fitted, in which latter case the upper wall of the cylindrical flue constitutes the bottom part of the pre-heating chamber.

The invention will be particularly described with reference to the accompanying drawings, wherein—

Fig. 1 is a vertical sectional elevation of a furnace according to the invention and Fig. 2 is a side sectional elevation of same.

The furnace is a rigid rectangular structure comprising side walls $a$, bottom $a^2$, top $a^3$ and front and rear walls $a^4$, $a^5$ encased by strong steel plates $c$ bolted to strengthening members $d$ provided along the edges of the walls aforesaid.

A main chamber $e$ of cylindrical tube-like formation is disposed centrally and horizontally within a cylindrical flue $f$, said chamber $e$ being supported laterally at or near its ends by the front and rear vertical walls of the structure enclosing the cylindrical flue $f$ as shown in Fig. 2. Said structure is conveniently built up of six segments $f^2$, $f^3$, $f^4$, $f^5$, $f^6$ and $f^7$ as shown, the external walls of the segments $f^2$, $f^3$, $f^4$ and $f^5$ being substantially circular while the other segments $f^6$ and $f^7$ constitute the front and rear walls of said structure. The whole structure aforesaid is suitably supported by carborundum or other brickwork at the front, back, sides and bottom thereof as at $g$, $g^2$, $g^3$ and $g^4$. The cylindrical chamber $e$, aforesaid, is accessible from the front and rear walls $a^4$, $a^5$, the former, more frequently used, being provided with a sliding door $e^2$ housed in guiding ways $e^3$, $e^4$ rigidly carried by the front $a^4$, while the back of the cylindrical chamber has a door or closing block $e^5$ rigidly secured by a detachable plate $e^6$ so that if it is desirable to heat a rod or bar intermediate of its ends the removal of the block aforesaid allows the use of the whole length of said cylindrical chamber $e$ from end to end.

The heating products from their usual source of supply enter the cylindrical flue $f$ by the pipe $h$ disposed low down in the furnace on one of the sides $a$ and conveniently embedded therein by carborundum as at $h^2$ and with fire clay $h^3$. Said products have a tangential flow in relation to the flue $f$, so that a whirling action is produced therein and there is a tendency for said products to remain for a long period of time in contact with the outer walls of said chamber $e$, and to circulate thereabout at least once completely round, it being particularly emphasized that the heating products do not come into contact with the work being heated in the main chamber $e$ entry being prevented thereinto by the closely fitting walls of the structure of the flue $f$ as this has been found to be undesirable. For a distance down the periphery on one side of the cylindrical flue is provided an aperture $j$ constituting a main flue exit which proceeds upwardly into a pre-heating chamber $j^2$ having an entrance $j^3$ closed by a sliding door $j^4$ retained in guide ways $j^5$, $j^6$ carried by the front wall of the furnace. The upper wall $j^7$ of said cylindrical flue constituted by the segments $f^2$, $f^3$ forms the bottom or resting surface of the pre-heating chamber $j^2$ where it is usual in this type of furnace to heat tools or the like in a moderate heat before subjecting same to the intense heat of the furnace proper.

Proceeding upwardly from the pre-heating chamber $j^2$ is an exit $k$ provided with a damper $k^2$ from which the heating products are led away for further use or for dispersion, but in certain cases it may be desirable to build a furnace embodying the essential features of the invention without including the pre-heating chamber, so that the heating products after circulation in the main flue $f$ are immediately led through an exit for the purpose aforesaid.

It is desirable to provide a lighting or safety hole into the main cylindrical flue as at $l$ disposed at right-angles to the tangential flow of the heating products thereinto, said safety hole $l$ being suitably closed when the furnace is in proper use.

From the foregoing description it will be apparent that the main cylindrical chamber will be easily renewable as may be desirable without breaking up or interfering with the main structure of the furnace.

Opposite the entrance $j^3$ to the pre-heating chamber $j$, a door or closing block may be provided for removal when pre-heating a bar or rod, same being detachably applied, for example, as the removable block $e^5$.

Having now described my invention what I claim and desire to secure by Letters Patent is:—

1. In a furnace of the kind and for the purpose described the combination of a main cylindrical chamber, means for closing said chamber at both ends, a cylindrical flue surrounding said chamber for the greater part of its length and whose interior walls are parallel, a tangential inlet for the heating products into the cylindrical flue arranged low down beneath the exterior walls of the chamber so that said products have a whirling motion imparted to them, an exit passing upwardly through the top wall of the cylindrical flue at the side thereof substantially as described.

2. In a furnace of the kind and for the purpose described the combination of a main cylindrical chamber, means for closing said chamber at both ends, a cylindrical flue surrounding said chamber for the greater part of its length and whose interior walls are parallel, a tangential inlet for the heating products into the cylindrical flue arranged low down beneath the exterior walls of the chamber so that said products have a whirling motion imparted to them, a pre-heating chamber arranged above the cylindrical flue from where the heating products are led away for dispersion or further use.

3. In a furnace of the kind and for the purpose described the combination of a main cylindrical chamber, means for closing said chamber at both ends, a cylindrical flue surrounding said chamber for the greater part of its length and whose interior walls are parallel, a tangential entry for the heating products underneath the main flue so that the products proceed underneath the main heating chamber to the back, over the top and then downwardly for a distance, finally passing away upwardly through the exit flue to the pre-heating chamber.

4. In a furnace of the kind and for the purpose described the combination of a main cylindrical chamber, means for closing said chamber at both ends, a cylindrical flue surrounding said chamber for the greater part of its length and whose interior walls are parallel, a tangential inlet for the heating products into the cylindrical flue arranged low down beneath the exterior walls of the chamber so that said products have a whirling motion imparted to them, removable doors or closing blocks provided on each end of the main heating chamber in order to allow a clear all-through passage for heating a bar or rod intermediate of its ends and for facilitating repairs.

5. In a furnace of the kind and for the purpose described the combination of a main cylindrical chamber, means for closing said chamber at both ends, a cylindrical flue surrounding said chamber for the greater part of its length and whose interior walls are parallel, a tangential inlet for the heating products into the cylindrical flue arranged low down beneath the exterior walls of the chamber, a lighting or safety hole for starting combustion and supplying air disposed at right-angles to the tangential flow of the heating products into the cylindrical flue.

In testimony whereof I have hereunto set my hand.

ALBERT EDWARD RUDD.